United States Patent [19]

Röhm

[11] Patent Number: 4,627,626
[45] Date of Patent: Dec. 9, 1986

[54] CHUCK FOR A HAMMER OR ROTARY IMPACT DRILL

[76] Inventor: Günter H. Röhm, Heinrich-Röhm-Str. 50, D-7927 Sontheim, Fed. Rep. of Germany

[21] Appl. No.: 726,596

[22] Filed: Apr. 23, 1985

[30] Foreign Application Priority Data

May 8, 1984 [DE] Fed. Rep. of Germany ....... 3416964

[51] Int. Cl.$^4$ ............................................. B25D 17/08
[52] U.S. Cl. .................................. 279/1 A; 279/19.3; 279/41 R; 279/62; 408/241 R
[58] Field of Search ............... 279/1 K, 1 ME, 60–65, 279/19, 19.3–19.5, 1 R, 1 B, 81, 89, 93, 41 R, 1 N, 1 SJ, 1 A, 76, 79, 80; 173/47, 48, 114, 115; 408/241 R; 409/231, 232, 234

[56] References Cited

U.S. PATENT DOCUMENTS 3,765,074  10/1973  Payne ................................ 279/41 R
4,154,450  5/1979  Derbyshire ....................... 279/60 X

FOREIGN PATENT DOCUMENTS 2824688  12/1979  Fed. Rep. of Germany ..... 279/1 A

Primary Examiner—Gil Weidenfeld
Assistant Examiner—Steven C. Bishop
Attorney, Agent, or Firm—Karl F. Ross; Herbert Dubno

[57] ABSTRACT

The chuck for holding a drill bit by its drill bit shaft comprises a chuck body connected to a drive shaft, a mounting opening in the chuck body in which the drill bit shaft is held coaxial with the chuck axis, a plurality of clamp jaws guided in the chuck body so as to be centrally advanceable to and retractable from the chuck axis in the mounting opening, an axial passage in the chuck body between the drive shaft and the mounting opening, through which hammer blows are transmitted to the drill bit shaft found in the mounting opening. In the mounting opening a chuck sleeve is clamped rigidly between the clamp jaws and in the chuck sleeve the drill bit shaft is guided slidably axially.

16 Claims, 13 Drawing Figures

CHUCK FOR A HAMMER OR ROTARY IMPACT DRILL

CROSS REFERENCE TO RELATED APPLICATIONS

This application is related to my copending applications Ser. No. 658,133 of 5 Oct. 1984, Ser. No. 686,243 of 26 Dec. 1984, Ser. Nos. 692,902 and 692,907 both of 18 Jan. 1985, Ser. Nos. 702,049 and 702,053 both of 15 Feb. 1985 and Ser. No. 703,888 of 21 Feb. 1985.

FIELD OF THE INVENTION

My present invention relates to a chuck in which a work tool, particularly a drill bit, is held by its shaft and, more particularly, to a hammer drill chuck in which hammer blows are transmitted directly to the end of the drill bit shaft held in the drill chuck.

BACKGROUND OF THE INVENTION

Prior hammer drill chucks generally comprised of a chuck body connected to a drive shaft of a drilling machine which provides hammer blows to a drill tool, a mounting opening in the chuck body for mounting the drill bit shaft coaxially with the chuck axis, a plurality of clamp jaws guided in the chuck body advanceable to and retractable from the mounting opening centrally and preferably inclined downwardly toward the drill bit, and an axial passage in the chuck body between the drive shaft and the mounting opening, through which the hammer blows are transmitted directly onto the end of the drill bit shaft in the mounting opening.

The hammer blows may be transmitted directly to the drill bit shaft by the axially mounted drive shaft which moves axially with respect to the chuck. Nevertheless it is also possible to provide a hollow drive shaft in which there is an axial passage therethrough down through which a ram moves axially to deliver hammer blows to the drill bit shaft.

In these prior art chucks it is a disadvantage in that the drill bit shaft in the clamp jaws shortly after operation is begun loosens to the extent that the drill bit can follow the hammer blow motion relative to the fixed clamp jaws. This loosening of the drill bit in the clamp jaws and the relative axial displacement of drill bit and jaws, causes an increased wear not only on the drill bit shaft, but also on the clamp surfaces or the clamp jaw edges of the clamp jaws. The replacement of clamp jaws made unserviceable by wear requires an increased expense and specially trained personnel.

OBJECTS OF THE INVENTION

It is an object of the invention to provide a chuck of the foregoing kind so that in operation of the drill bit in the chuck the chuck jaws are protected from wear by the axial displacement of the drill bit.

It is a general object of my invention to provide an improved chuck, particularly an improved drill chuck for a hammer drill.

SUMMARY OF THE INVENTION

These objects and others which will become apparent hereinafter are attained in a chuck, particularly a drill chuck for a hammer drill, comprising a chuck body connected to a drive shaft of a drilling machine and provided with a mounting opening therein for mounting a drill bit with its drill bit shaft coaxial to the drill chuck axis, centrally adjustable clamp jaws guided in the chuck body so as to advance into and retract from the mounting opening, and an axial passage in the chuck body between the drive shaft and the mounting opening through which the hammer blows are transmitted to the drill bit shaft in the mounting opening.

According to the invention, a chuck socket or sleeve is clamped in the mounting opening and held fixed in position between the clamp jaws and in the chuck sleeve, the drill bit shaft is guided slidably axially.

The advantage gained by my invention is that the drill bit can move axially due to the hammer blows relative to the jaws but out of contact with the clamp jaws, because the drill bit rides in the sleeve. The latter is firmly clamped in the clamp jaws and functions so that there is no relative motion between it and the clamp jaws so that no effects of wear can arise on the clamp jaws. The wear effects are all confined to the inside of the chuck sleeve, which guides the drill bit contacting it. In the chuck sleeve, wear effects are however only of slight significance, because the chuck sleeve is an object of low cost which can be quickly and inexpensively replaced, should it become useless.

An additional essential advantage of the invention is that it is possible using a variety of different suitable chuck sleeve forms to compensate for differences in different hammer drill bits while utilizing the same chuck, thus increasing the applicability of a particular chuck and hammer drill machine.

In a preferred embodiment of my invention the chuck sleeve has on its exterior a plurality of axial chuck sleeve grooves in which the jaw edges of the clamp jaws engage, whereby a simple secure connection between the drill chuck and the chuck sleeve results in which rotary slipping or relative rotation of the chuck sleeve in the drill chuck is prevented.

The chuck sleeve is of a suitable size and shape so that it just fits in the mounting opening of the chuck body. Preferably, the chuck sleeve and the mounting opening are both substantially cylindrical and the outer diameter of the chuck sleeve equals the inner diameter of the mounting opening so that the wall of the chuck sleeve is supported circumferentially on the chuck body and therefore the chuck sleeve can be constructed comparatively thin-walled.

For securing the chuck sleeve in the axial direction, the chuck sleeve should be provided on its drill bit receiving front end with a circular collar directed toward the exterior of the drill chuck and contacting on the outer front surface of the chuck body and at its other end, the chuck sleeve is braced on a circular shoulder of the chuck body in the entrance between the axial passage and the mounting opening. Moreover, the circular collar stabilizes the chuck sleeve on its drill bit front edge mechanically.

Advantageously, the chuck sleeve and the passage in the chuck body have equal inner diameters so that a drill bit shaft seated in the chuck sleeve projects up into the passage in the chuck body where it also can be guided. Conversely, the portion of the drive shaft transmitting the hammer blows, particularly a hammer die, can advance into the chuck sleeve, should the drill bit shaft not be deeply enough insertable into the chuck sleeve.

Particularly in the hammer drill bit, for a rotational locking of the drill bit in the chuck sleeve according to the invention, the chuck sleeve is provided on its inside with at least one radially projecting entrainer or catch piece or lug, which engages in an axial drill bit groove in the drill bit shaft, whereby the axial drill bit groove allows an axial motion of the drill bit relative to the chuck sleeve and the catch piece.

In drill bits with that kind of axial groove, at least one axial groove is closed at its shaft end in order to prevent the drill bit from falling out of the drill chuck.

Therefore, in the design of the chuck sleeve of the invention, upon insertion of the drill bit shaft in the chuck sleeve the axial grooves closed at the shaft ends must be able to fit past the entraining lugs. The catch pieces must be engageable in the start of the axial drill bit grooves at some distance from the shaft end and be held therein.

According to the invention at least one of the entrainer lugs, which engage in the axial drill bit grooves closed at the end of the drill bit shaft, sits on an axial spring plate cut out of the wall of the chuck sleeve, the spring plate being braced radially outwardly directed on the wall of the mounting opening.

The drill bit shaft can be directly inserted in the chuck sleeve taken out of the mounting opening of the drill chuck, since the entrainer lug can be moved radially outwardly on its spring plate. Then the drill bit with its attached chuck sleeve is reinserted in the mounting opening of the chuck and the chuck sleeve gripped between the clamp jaws so that the foregoing kind of movement of the entrainer lug on the spring plate from the drill bit grooves is no longer possible, since the spring plate is braced on the wall of the mounting opening.

According to another feature of the invention, the chuck sleeve is divided axially into sleeve halves and both chuck sleeve halves are held together by at least one spring ring, which lies in a circular groove in the outer circumferential surface of the chuck sleeve.

It is also possible in this embodiment upon removal of the chuck sleeve from the mounting opening, to insert the drill bit shaft with its drill bit grooves closed at the end of the shaft into the chuck sleeve, because both chuck sleeve halves in the spring rings can spread away from each other. On the other hand, when the chuck sleeve with the drill bit inserted sits again in the mounting opening of the chuck body, such a spreading out or expansion of the chuck sleeve is no longer possible, so that the axial securing of the drill bit by the entrainer lugs engaging the axial drill bit grooves closed at their shaft ends is guaranteed.

According to a further feature of the invention, the chuck sleeve has an axially extending slot passing through a wall thereof and the chuck sleeve parts or halves on both sides of the axial slot are held together by a hinged joint lying diametrically opposite the axial slot, which allows expansion of the chuck sleeve or spreading out of the chuck sleeve parts. In one embodiment the chuck sleeve, especially when it is of a plastic material, has its hinged joint constructed with reduced wall strength as a kind of film joint known and used commonly in plastic parts.

In additional preferred embodiments of the chuck sleeve, there are two entrainer lugs positioned on opposite sides of the side wall of the chuck sleeve corresponding to two axial drill bit grooves closed at the shaft end on opposite sides of the drill bit. Furthermore, there are preferably two entrainer lugs positioned on opposite sides of the side wall of the chuck sleeve corresponding to two axial grooves open at the drill bit shaft end on opposite sides of the drill bit shaft. However, my invention is not to be considered limited by either the number of entrainer lugs or drill bit axial grooves.

Finally, I can forego entirely the springlike or movable parts of the chuck sleeve. In a preferred embodiment in which this is the case, the chuck sleeve has a window in the chuck sleeve wall allowing the passage of the drill bit shaft therethrough and an entrainer lug positioned on the side wall of the sleeve lying opposite the window for engagement in an axial drill bit groove closed at the end of the shaft. The front end opening of the sleeve is widened at its edges so that the drill slanted to the sleeve axis is insertable and guidable through the opening, down through the window, and in front of the entrainer lug so that at least the beginning of the axial drill bit groove can engage the entrainer lug. In this insertion process when the entrainer lug has reached the beginning of the axial drill bit groove, the drill shaft can then be aligned with its axis parallel to the sleeve axis, and subsequently completely pushed into position coaxial to the sleeve axis. Moreover, the chuck sleeve can therefore be so formed that it is circumferentially closed at the rear of the window and the side wall has a plurality of catch members for engagement in one of a corresponding plurality of open axial drill bit grooves open at their drill bit shaft ends.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
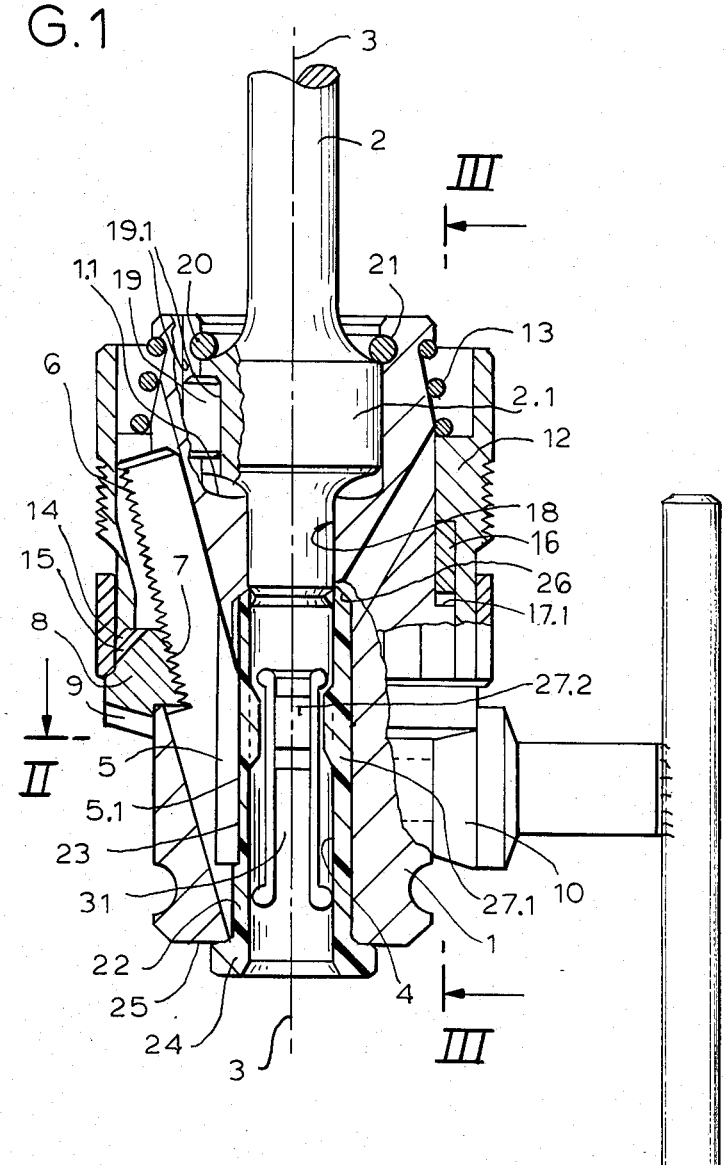
FIG. 1 is an axial cross section of a chuck according to my invention.

The chuck shown in FIG. 1 has a chuck body 1 connected to a drive shaft 2 of a drilling machine (not shown) for providing hammer blows to a drill bit not shown in FIG. 1.

A mounting opening 4, preferably cylindrical, for the drill bit is coaxial with the chuck axis 3. Downwardly into this mounting opening 4 centrally adjustable clamp jaws 5 are advanced in the chuck body 1. These clamp jaws 5 engage with their gear teeth 6 in the inner gear 7 of a toothed adjustable ring 8, which is supported rotatably and axially unshiftably on the chuck body 1 and which has an additional exterior circular toothed gear 9 engageable by a pinion gear 10 of a key 11 insertable in the chuck body 1. The toothed adjustable ring 8 is rotatable by means of the key 11 or by hand, so as to feed the clamp jaws 5 in their guides passages in the chuck body 1 according to the desired direction or motion either further into or out from the mounting opening 4.

To hold fixed in position the adjustable ring 8 and thus halt undesired rotation, an actuating jacket 12 is supported so as to be rotatable between two positions, the actuating jacket 12 being shiftable axially against the restraining force of a retaining spring 13. The actuating jacket 12 has a toothed gear 14 on its drill bit directed front edge, which can engage in a corresponding internal circular gear 15 of the adjustable ring 8 on the side of the adjustable ring 8 opposite to exterior circular gear 9 so as to hold the toothed ring 8 in position.

Figure 3:
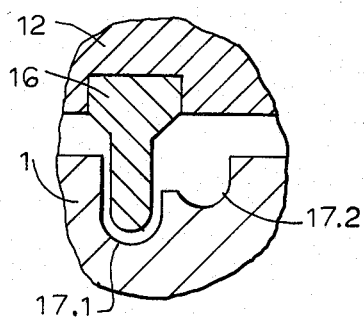
FIG. 3 is a cross sectional view of a detail of the chuck taken along the line III—III of FIG. 1.

On the inner side of the actuating jacket 12 a projecting lug 16 is found which according to FIG. 3 can engage in two lock recesses 17.1 and 17.2 positioned at different axial heights in chuck body 1 according to the rotary position of actuating jacket 12. In the position shown in FIG. 3 the actuating jacket 12 is found in its forward position in which the adjustable ring 8 is engaged and held in position. On the other hand when the lug 16 is in the shallower lock recess 17.2, the actuating jacket 12 is held in an axially withdrawn position so that the adjustable ring 8 is rotatable.

The chuck body 1 is further provided with an axial passage 18 between the mounting opening 4 and the drive shaft 2, through which the impact of the drive shaft 2 in this preferred embodiment of my invention is transmitted directly on the end of the drill bit held in the mounting opening 4.

Moreover the chuck body 1 is attached to the drive shaft 2 to prevent rotation with respect to each other but allow axial play, the drive shaft 2 serving both for transmission of the rotary motion and the hammer blows.

The rotary locking of the chuck body 1 on the drive shaft 2 is effected by axial connectors 19, which lie in cavities 19.1 penetrating adjacent portions of external collar 2.1 of drive shaft 2 and the chuck body 1 and allow axial relative motion of the chuck body 1 on the drive shaft 2. The axial limit of the free play of the chuck body 1 is caused by impact of the external collar 2.1 directly on the circular shoulder 1.1 of the chuck body 1.

On the opposite side of the collar 2.1 the drill chuck is secured on the drive shaft 2 axially by a spring ring 20, which overlaps the collar 2.1 and lies in a circular groove 21 of the chuck body 1.

In the mounting opening 4 of the chuck body 1 a chuck sleeve 22 is clamped firmly between the clamp jaws 5, in which the drill bit shaft 28 is guided adjustably. The chuck sleeve 22 has exterior axial grooves 23, in which the clamp jaws 5 with their jaw edges 5.1 engage, so that relative rotation of the clamp jaws 5 and the chuck sleeve 22 is prevented.

The chuck sleeve 22 and the mounting opening 4 in chuck body 1 are approximately cylindrical. The largest outer diameter of the chuck sleeve 22 is equal to the inner diameter of the mounting opening 4. Besides the largest outer diameter of the chuck sleeve 22 preferably has substantially the same inner diameter as the axial passage 18 in chuck body 1, so that the drive shaft 2 in that case contacts on the chuck sleeve 22 or on a drill bit guided in the chuck sleeve 22 extending into the axial passage 18.

The impact on the drill bit shaft 28 is provided by the drive shaft 2. The chuck sleeve 22 sits in chuck body 1 with a circular collar 24 directed toward the outside of the chuck body 1 on the drill bitward directed front end of the chuck sleeve 22. This collar 24 simultaneously stabilizes the socket edge mechanically, on the front surface 25 of the chuck body 1. On the other end the chuck sleeve 22 is braced on a circular shoulder 26 of chuck body 1 in the entrance between the axial passage 18 and the mounting opening 4.

Figure 10:
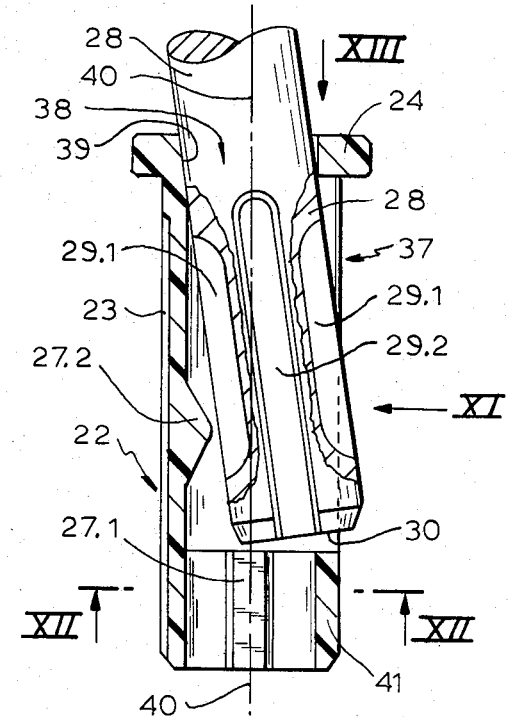
FIG. 10 is an axial cross section through yet another embodiment of the chuck sleeve.
Figure 13:
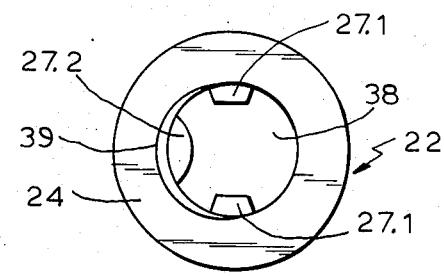
FIG. 13 is a top plan view of the chuck sleeve according to FIG. 10 taken in the direction of the arrow XIII thereof.

On its inner side the chuck sleeve 22 is provided with radially protruding entrainer lugs 27.1 and 27.2, which engage in one of a plurality of axial drill bit grooves 29.1 and 29.2 in the drill bit shaft 28 to prevent rotation of the drill bit with respect to the chuck sleeve 22. One such drill bit shaft 28 is shown in FIG. 10. At least one of its axial drill bit grooves 29.1 ends axially before reaching the shaft end 30, so that the entrainer lug 27.2 engaging in this axial groove 29.1 guarantees the drill bit does not axially fall from the chuck sleeve 22.

Figure 2:
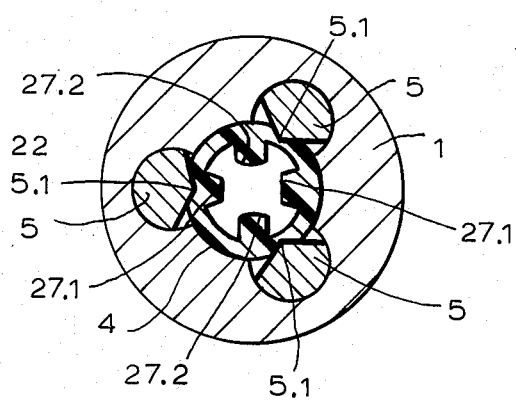
FIG. 2 is a cross sectional view of the chuck taken along the line II—II of FIG. 1.
Figure 8:
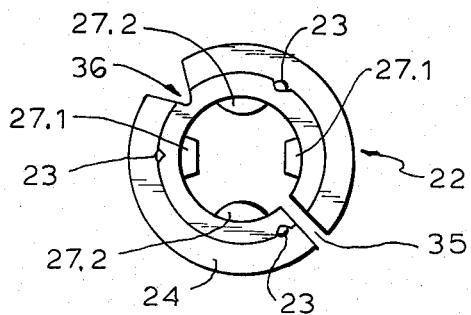
FIG. 8 is a top plan view taken in the direction of the arrow VIII of FIG. 7.

In the embodiments shown in FIG. 1 and FIG. 2 the rigid entrainer lug 27.1 on the wall of the sleeve 22 engages in axial drill bit grooves 29.2 open up to the shaft and 30, so that these entrainer lugs 27.1 can be inserted in the axial drill bit grooves 29.2 open from beginning to the end of the drill bit shaft 30, when the drill bit shaft 28 is held in the appropriate rotary position for insertion.

The entrainer lugs 27.2 associated with axial grooves 29.1 on the drill bit shaft 28 closed at the shaft end 30 sit on axially extending spring plates 31 cut out from the wall of the clamping sleeve 22.

The drill bit shaft 28 is inserted in the chuck body 1, pivoted radially outward from the chuck sleeve axis, so as to be able to pass the ungrooved end 30 of the drill bit shaft 28 by entrainer lug 27.2, and, when the drill bit shaft 28 has been inserted deeply enough, engages it in the axial grooves 29.1 of the drill bit shaft 28.

Subsequently the drill bit shaft 28 with the chuck sleeve 22 attached is reinserted in the mounting opening 4 for the drill bit. The spring plates 31 projecting radially outwards are braced on the walls of the mounting opening 4. The drill bit shaft 28 can no longer be pivoted from the chuck sleeve axis in the chuck sleeve 22, and thus is secured from falling out of the chuck sleeve 22.

Figure 5:
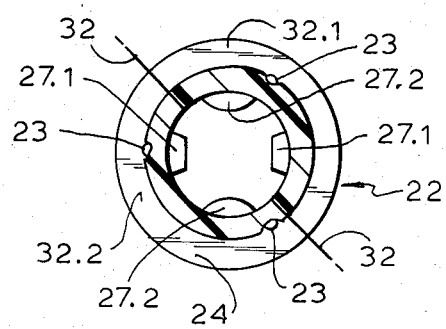
FIG. 5 is a cross section taken along the section line V—V of FIG. 4.
Figure 4:
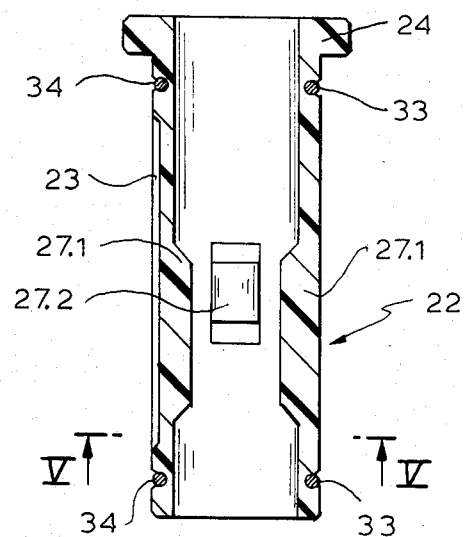
FIG. 4 is an axial cross section of another specific embodiment of a chuck sleeve for the chuck of FIG. 1.
Figure 9:
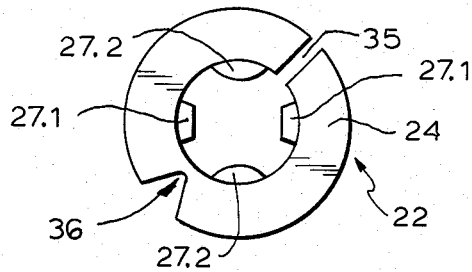
FIG. 9 is a bottom plan view of the chuck sleeve taken in the direction of the arrow IX of FIG. 7.
Figure 6:
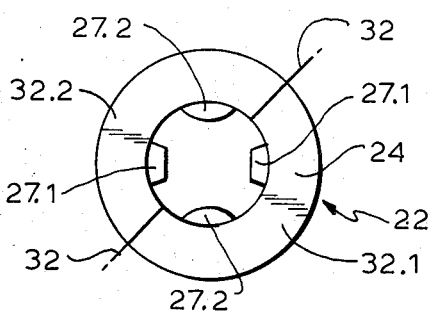
FIG. 6 is a top plan view of the chuck sleeve taken in the direction of the arrow VI in FIG. 4.
Figure 12:
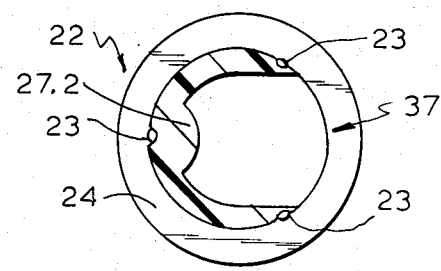
FIG. 12 is a cross section taken along line XII—XII of FIG. 10.
Figure 11:
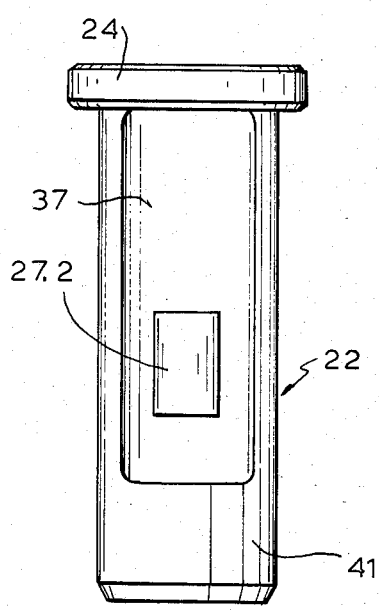
FIG. 11 is a side view taken in the direction of the arrow XI of FIG. 10.

In the specific embodiment according to FIGS. 4 to 6 on the other hand the chuck sleeve 22 is divided axially along the plane 32. Both chuck sleeve halves 32.1 and 32.2 are held together by spring rings 33, which lie in the circular grooves 34 in the outer circumferential surface of the chuck sleeve 2 deep enough so that their outer edges are approximately flush with the upper surface.

The chuck sleeve 22 taken out of the mounting opening 4 is connected to the drill bit shaft 28, so that both chuck sleeve halves 32.1 and 32.2 expand slightly against the force of the spring rings 33, when the ungrooved shaft end 30 passes the engaging entrainer lugs 27.2 and 27.1. The entrainer lugs 27.1 and 27.2 can moreover have a variety of profiles, preferably similar to a profile matching the corresponding profile of the axial drill bit grooves 29.1 and 29.2 in the drill bit shaft 28.

Figure 7:
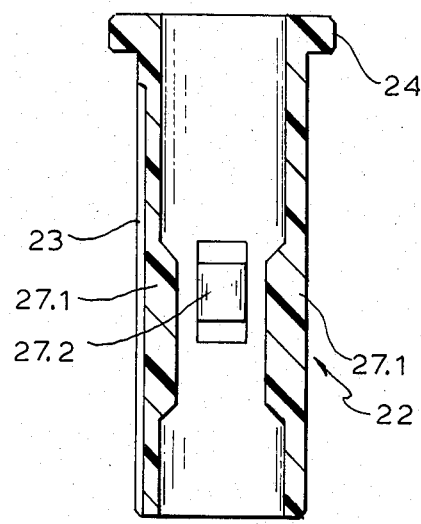
FIG. 7 is an axial cross section through a further specific embodiment of the chuck sleeve similar to the chuck sleeve shown in FIG. 4.

In the specific embodiment according to FIG. 7 the chuck sleeve 22 is cut through on one side by an axial slot 35. The sleeve portions or halves on both sides of the axial slot 35 are held together by a hinged joint 36, which is positioned diametrically opposing the axial slot 35 and allows an expansion of both sleeve portions, when the chuck sleeve 22 is pushed on the ungrooved end 30 of the drill bit shaft 28. Particularly when the chuck sleeve 22 is of a plastic material, the hinged joint 36 can be constructed as a kind of film joint, which is more easily accomplished by a suitable reduction of the thickness of the sleeve wall.

In both the previously mentioned specific embodiments according to FIGS. 4 to 7 the compression or expansion of the chuck sleeve 22 is prevented, when the chuck sleeve 22 with the drill bit inerted is guided into the mounting opening 4 of the chuck body 1.

FIGS. 10 to 13 show a specific embodiment of the chuck sleeve 22 without moving or compressible parts. Here the chuck sleeve 22 has a window 37 in the sleeve wall allowing the passage of the drill bit 28 through it. On the inside of the sleeve wall lying opposite the window 37 is another entrainer lug 27.2, which is structured for engagement in the axial drill bit groove 29.1 closed at the end 30 of the drill bit shaft 28. The opening 38 at the tool-bit-receiving end of the chuck sleeve 22 for receiving the drill bit is widened at the sleeve edge 39 so that the drill bit shaft 28 is inclined to the sleeve axis 40 first through the opening 38 and then through the window 37 past the entrainer lug 27.2 so that the entrainer lug 27.2 can be inserted into the axial groove 29.1 of the drill bit shaft 28.

In this position shown in FIG. 10 the drill bit shaft 28 is aligned finally coaxially with the chuck sleeve axis 40, the entrainer lug 27.2 entering into the axial groove 29.1 and pushed completely to the right in the chuck sleeve 22, the shaft end 30 being thrust into the circumferentially closed portion 41 of the chuck sleeve 22. On the inner side of this sleeve portion 41 entrainer lugs 27.1 are provided for axial grooves 29.2 which extend to the drill bit shaft end 30. These entrainer lugs 27.1 can enter the axial grooves 29.2 when the drill bit shaft 28 is aligned parallel to the chuck sleeve axis 40, and to complete the insertion process the shaft end 30 is inserted in the circumferentially closed portion 41 of the chuck sleeve 22.

In the embodiments of the chuck sleeve 22 described above there are preferably two axial drill bit grooves 29.1 closed at the drill bit shaft end 30 on opposite sides of the drill bit shaft 28 and correspondingly two entrainer lugs 27.1 positioned on opposite sides of the inner wall of chuck sleeve 22. Furthermore there are preferably two axial drill bit grooves 29.2 open at the drill bit shaft end 30 on opposite sides of the drill bit shaft 28 and correspondingly two entrainer lugs 27.2 positioned on opposite sides of the inner wall of chuck sleeve 22 in the embodiments without a window in the chuck sleeve wall. However this invention is not to be considered limited by either the number of entrainer lugs or drill bit grooves.

I claim:

1. In a chuck for a drill bit having a drill bit shaft for engagement in said chuck, particularly a hammer drill chuck, comprising a chuck body connected to a drive shaft that provides hammer blows to a drill bit, a mounting opening formed in said chuck body coaxial with a chuck axis of said chuck body, said drill bit shaft being held in said mounting opening, a plurality of clamp jaws guided in said chuck body so as to be centrally advanceable to and retractable from said mounting opening, an axial passage formed in said chuck body between said drive shaft and said mounting opening, said hammer blows of said drive shaft being transmitted through said axial passage to said drill bit shaft in said mounting opening, the improvement wherein a chuck sleeve is rigidly clamped in said mounting opening and said drill bit shaft is axially slidable in said chuck sleeve.

2. The improvement according to claim 1 wherein said chuck sleeve has a plurality of exterior axial chuck sleeve grooves engageable by jaw edges of said clamp jaws.

3. The improvement according to claim 1 wherein said chuck sleeve is of a size so as to fit into said mounting opening of said chuck body.

4. The improvement according to claim 3 wherein said chuck sleeve and said mounting opening are substantially cylindrical and a largest outer diameter of said chuck sleeve is substantially equal to an inner diameter of said mounting opening.

5. The improvement according to claim 1 where said chuck sleeve has a circular collar at a drill bit front end thereof which contacts and presses on a front surface of said chuck body and an end of said chuck sleeve opposite said circular collar is braced on a circular shoulder of said chuck body at an entrance between said axial passage and said mounting opening.

6. The improvement according to claim 1 wherein said chuck sleeve and said axial passage in said chuck body have an equal inner diameter.

7. The improvement according to claim 1 wherein a side wall of said chuck sleeve has at least one projecting entrainer lug, said lug being engageable in at least one axial drill bit groove formed in said drill bit shaft so as to prevent relative rotation between said drill bit and said sleeve.

8. The improvement according to claim 7 wherein said axial drill bit groove of said drill bit shaft is closed at an end thereof, and said entrainer lug engaging said drill bit groove is mounted on a spring plate axially cut out of said side wall of said chuck sleeve, said chuck sleeve being braced radially outward on a wall of said mounting opening.

9. The improvement according to claim 8 wherein said chuck sleeve has two of said entrainer lugs mounted on two of said spring plates, said spring plates being positioned on opposite sides of said chuck sleeve.

10. The improvement according to claim 7 wherein said chuck sleeve is divided axially into two halves, both halves of said chuck sleeve being held together by at least one spring ring seated in a circular groove formed in an outer peripheral surface of said chuck sleeve.

11. The improvement according to claim 10 wherein said chuck sleeve has a first pair of said entrainer lugs positioned on opposite sides of said side wall of said chuck sleeve for engagement in a first pair of said axial drill bit grooves closed at an end of the drill bit shaft and a second pair of said entrainer lugs also positioned on opposite sides of said side wall of said chuck sleeve offset from said first pair of lugs for engagement in a second pair of said axial drill bit grooves open at the end of the drill bit shaft.

12. The improvement according to claim 7 wherein said chuck sleeve has an axial slot formed in the side wall thereof and extending therethrough and forming halves of said chuck sleeve on both sides of said axial slot which are held together by a hinged joint lying diametrically opposite said axial slot, said hinged joint allowing expansion of said chuck sleeve.

13. The improvement according to claim 12 wherein said chuck sleeve is formed of a plastic material and said hinged joint is constructed as a film joint.

14. The improvement according to claim 13 wherein said chuck sleeve has a first pair of said entrainer lugs positioned on opposite sides of said side wall of said chuck sleeve for engagement in a first pair of said axial drill bit grooves closed at an end of the drill bit shaft and a second pair of said entrainer lugs also positioned on opposite sides of said side wall of said chuck sleeve offset from said first pair of lugs for engagement in a second pair of said axial drill bit grooves open at the end of the drill bit shaft.

15. The improvement according to claim 7 wherein said chuck sleeve has a window in said side wall of said chuck sleeve allowing insertion of said drill bit shaft, and said entrainer lug on said side wall of said chuck sleeve is positioned opposite to said window for engagement in said axial drill bit groove of said drill bit shaft, and an edge of said chuck sleeve is widened whereby said drill bit shaft can be inserted into said sleeve and guided by said edge and said window slantedly to said chuck sleeve axis whereby said axial drill bit groove is positionable in registration with said entrainer lug.

16. The improvement according to claim 15 wherein said chuck sleeve is circumferentially closed axially adjacent to a side of said window, said closed side wall of said chuck sleeve being provided with at least one of said entrainer lugs for engagement in one of said axial drill bit grooves on said drill bit shaft open at an end of said drill bit shaft.

* * * * *